(12) United States Patent
Cartabbia et al.

(10) Patent No.: US 12,059,055 B2
(45) Date of Patent: Aug. 13, 2024

(54) METHOD FOR THE THREE-DIMENSIONAL FORMING OF AN UPPER OF A FOOTWEAR

(71) Applicant: MACPI S.P.A. PRESSING DIVISION, Palazzolo sull'Oglio (IT)

(72) Inventors: Giovanni Cartabbia, Palazzolo sull'Oglio (IT); Paolo Cartabbia, Palazzolo sull'Oglio (IT)

(73) Assignee: MACPI S.P.A. PRESSING DIVISION, Palazzolo sull'Oglio (IT)

( * ) Notice: Subject to any disclaimer, the term of this patent is extended or adjusted under 35 U.S.C. 154(b) by 885 days.

(21) Appl. No.: 16/979,564

(22) PCT Filed: Mar. 19, 2019

(86) PCT No.: PCT/IB2019/052206
§ 371 (c)(1),
(2) Date: Sep. 10, 2020

(87) PCT Pub. No.: WO2019/180603
PCT Pub. Date: Sep. 26, 2019

(65) Prior Publication Data
US 2021/0008823 A1 Jan. 14, 2021

(30) Foreign Application Priority Data

Mar. 19, 2018 (IT) .......................... 102018000003730

(51) Int. Cl.
*A43B 23/04* (2006.01)
*A43B 23/02* (2006.01)
(Continued)

(52) U.S. Cl.
CPC ........ *A43B 23/042* (2013.01); *A43B 23/0215* (2013.01); *A43B 23/0245* (2013.01); *A43D 3/02* (2013.01); *B29K 2101/12* (2013.01)

(58) Field of Classification Search
None
See application file for complete search history.

(56) References Cited

U.S. PATENT DOCUMENTS 3,784,995 A * 1/1974 Egtvedt ................ A43D 111/00
12/127
4,964,229 A * 10/1990 Laberge .................. B29C 51/00
264/223

(Continued)

FOREIGN PATENT DOCUMENTS

| EP | 3 244 764 A1 | 11/2017 | |
| WO | 2016115156 A1 | 7/2016 | |
| WO | WO-2016115157 A1 * | 7/2016 | ............... A43B 1/04 |

OTHER PUBLICATIONS

International Search Report and Written Opinion issued Application No. PCT/IB2019/052206, dated Jul. 12, 2019.

*Primary Examiner* — Megan E Lynch
(74) *Attorney, Agent, or Firm* — JONES ROBB, PLLC

(57) ABSTRACT

A method for the three-dimensional forming of an upper of a footwear, comprises: preparing a sock comprising thermoplastic yarns; fitting the sock on a reference form of an upper to be formed; placing the reference form with the sock in an oven; heating the sock in the oven up to determining the at least partial fusion of thermoplastic material of the thermoplastic yarns of the sock; cooling the sock up to determining the cross-linking of the thermoplastic material and the formation of the upper with more rigid portions and less rigid portions; removing the upper from the reference form.

14 Claims, 6 Drawing Sheets

(51) Int. Cl.
  *A43D 3/02* (2006.01)
  *B29K 101/12* (2006.01)

(56) References Cited

U.S. PATENT DOCUMENTS

| | | | |
|---|---|---|---|
| 6,299,817 B1 * | 10/2001 | Parkinson | A43B 3/02 264/246 |
| 2014/0237738 A1 * | 8/2014 | Johnson | B29D 35/126 12/107 R |
| 2015/0230550 A1 * | 8/2015 | Bacino | A43D 25/00 36/43 |
| 2015/0313316 A1 * | 11/2015 | Boucher | D04B 1/16 36/93 |
| 2015/0342296 A1 * | 12/2015 | Skaja | A43B 9/12 36/83 |
| 2016/0021979 A1 | 1/2016 | Iuchi et al. | |
| 2016/0113356 A1 * | 4/2016 | Clough | A41B 11/00 36/71.5 |
| 2016/0185062 A1 * | 6/2016 | Boucher | A42B 3/06 264/516 |
| 2017/0027284 A1 | 2/2017 | Craig | |
| 2017/0042280 A1 * | 2/2017 | Bacino | A41B 11/005 |
| 2017/0066212 A1 * | 3/2017 | de Backer | A43D 3/02 |
| 2017/0129200 A1 * | 5/2017 | Adami | A43B 1/04 |
| 2017/0181501 A1 * | 6/2017 | Gautier | A43C 1/00 |
| 2018/0065353 A1 * | 3/2018 | Wang | B32B 37/12 |
| 2018/0103726 A1 * | 4/2018 | Cross | A43B 13/02 |
| 2018/0127904 A1 * | 5/2018 | Adami | D04B 1/12 |

* cited by examiner

METHOD FOR THE THREE-DIMENSIONAL FORMING OF AN UPPER OF A FOOTWEAR

This application is a U.S. national stage application under 35 U.S.C. § 371(c) of International Application No. PCT/162019/052206, filed on Mar. 19, 2019, which claims priority to Italian Patent Application No. 102018000003730, filed on Mar. 19, 2018, the entire content each of which is incorporated by reference herein in its entirety.

FIELD OF THE INVENTION

The present invention regards a method for the three-dimensional forming of an upper of a footwear. The present invention also regards an apparatus for the three-dimensional forming of an upper of a footwear and a process for making a footwear. In particular, the present invention has the object of the three-dimensional stable forming of an upper, possibly complete with reinforcement and/or decorative technical parts starting from a sock.

DEFINITIONS

In the present description and in the attached claims, the expression "upper" is used to indicate a footwear that wraps the foot, i.e. both the upper part of the footwear—most exposed and visible—which covers the top part of the foot as well as the lower part, or insole, intended to remain concealed between the upper part and the sole of the footwear.

In the present description and in the attached claims, the expression "thermoplastic or thermo-adhesive yarn" is used to indicate a yarn comprising thermoplastic polymers, i.e. polymers formed by linear or non-ramified chains, not bound to each other. Thus, it is sufficient to increase the temperature to bring them to viscous state and thus be able to form them. Thus, the thermoplastic or thermo-adhesive yarns have the capacity to modify their structure at a determined temperature (usually comprised between 60° C. and 180° C.), and thus fuse upon reaching such temperature and cross-linking once cooled.

The expression "sock" is used to indicate a substantially tubular-shaped textile product, provided with synthetic and/or natural yarns, for example but not necessarily made by circular knitting machines.

BACKGROUND OF THE INVENTION

In such context, it is known to make footwear using textile portions provided with fusible strands or fibres. Documents EP1571938, WO2016115156, US2017027284 and US2016021979 illustrate some examples thereof.

SUMMARY

In such context, the Applicant set out the goal of providing a process for making a footwear starting from a textile product provided with thermoplastic or thermo-adhesive yarns that is quick and relatively economic but that simultaneously obtaining a quality product. In particular, the Applicant set out the goal of providing a method for the three-dimensional forming of an upper of a footwear in the aforementioned process for making the footwear.

The Applicant found out that the objects outlined above and others can be substantially obtained starting from a sock provided with the aforementioned thermoplastic or thermo-adhesive yarns which is given a shape, heated and subsequently cooled in a uniform manner, so as to determine the at least partial fusion and the subsequent cross-linking of the thermoplastic polymers of said thermoplastic or thermo-adhesive yarns and thus the formation of a stable three-dimensional upper.

In particular, the Applicant found out that the objects outlined above and others can be substantially achieved by a method and an apparatus for the three-dimensional forming of an upper of a footwear and a process for making a footwear according to one or more of the attached claims and/or according to one or more of the following aspects.

According to an independent aspect, the present invention regards a method for the three-dimensional forming of an upper of a footwear.

The method comprises:
preparing a sock comprising thermoplastic yarns;
fitting the sock on a reference form of an upper to be formed;
placing the reference form with the sock in at least one oven;
heating the sock in the oven up to determining the at least partial fusion of thermoplastic material of the thermoplastic yarns of said sock;
cooling the sock up to determining the cross-linking of the thermo-plastic material and the formation of the upper, preferably with more rigid portions and less rigid portions;
removing the upper from the reference form.

According to an aspect, the present invention regards a process for making a footwear, comprising the aforementioned method and/or the method as claimed in the attached claims and/or described in the following aspects. Preferably, the process further comprises applying a sole to the upper.

According to an aspect, the present invention regards an apparatus for implementing the aforementioned method and/or as claimed in the attached claims and/or described in the following aspects.

According to an independent aspect, the present invention regards an apparatus for the three-dimensional forming of an upper of a footwear, comprising: an oven, a cooling chamber.

Preferably, the oven is configured for heating and/or steaming (in the sense of exposing to steam) the sock in the oven up to determining the at least partial fusion of the thermoplastic material of the thermoplastic yarns of said sock.

Preferably, the cooling chamber is configured to cool the sock up to determining the cross-linking and crystallisation of the thermo-plastic material and the formation of the upper, preferably with more rigid portions and less rigid portions.

The Applicant observed that the present invention allows to make the upper of the footwear, and thus also the footwear as a whole, starting from a sock in a relatively quick, simple and economic manner.

Furthermore, the Applicant observed that the present invention allows to confer to the upper the desired structural characteristics, for example with consistency and/or rigidity differentiated in the different points of the upper.

The end result is a product with the three-dimensional form of the core/reference form, preferably provided with a differentiated structure in terms of rigidity/softness depending on how the weaving and distribution of the thermoplastic yarns is carried out.

Further aspects of the present invention are listed hereinafter.

Preferably, the sock comprises, besides the thermoplastic yarns, synthetic and/or natural yarns.

Preferably, the sock is a tubular body.

Preferably, the sock is made by means of weaving.

Preferably, the sock is made on looms/circular or straight knitting machines.

Preferably, the thermoplastic yarns are arranged in different manners and with different densities during weaving.

Preferably, the thermoplastic yarns are present in percentages variable from one area to the other, and preferably comprised between 20% and 80%.

Preferably, the percentages of the thermoplastic yarns are higher at the tip and/or heel and/or insole and lesser elsewhere.

Preferably, the thermoplastic yarns are heat-fusible and/or heat-shrinking.

Preferably, the thermoplastic yarns have counts (in dTex) and/or calibres (intended as diameters) and/or different thermoplastic and/or heat-shrinking characteristics.

The Applicant observed that the arrangement and/or characteristics of the thermoplastic yarns allow to obtain consistencies and/or rigidities differentiated in terms of different areas/portions/points of the upper.

Preferably, at the end of the weaving, the sock has an opening on each of the two opposite ends of the tubular body. Socks closed on one side and open on the side where this technology can always be applied are also available.

Preferably, the sock is of the single layer type and it has main opening, configured to insert a foot, and at least one auxiliary opening, preferably arranged on an end/tip of said sock opposite to that of the main opening. The auxiliary opening is obtained from a weaving step of said sock, in the sense that the knitting machine of the circular type used to make it does not envisage closing it.

Preferably, the sock is of the single or double layer type and in the second case it has a first sock, or outer sock, and a second sock, or inner sock, mutually joined at an ankle area. At the end of the weaving, the inner sock and the outer sock are mutually joined in said ankle area and consecutively arranged one with respect to the other to form a single tubular body provided with two auxiliary openings arranged at the ends thereof. The inner sock can be positioned inside the outer sock to form a double-layer sock. When the inner sock is turned inside-out and inserted into the outer sock, as a whole the sock has a main opening configured for inserting one foot and two auxiliary openings, one on one end/tip of the outer sock and one on one end/tip of the inner sock.

Preferably, the inner sock comprises or does not comprise the thermoplastic yarns.

Preferably, as a whole the sock is fitted onto the reference form, heated and cooled while the inner sock is arranged inside the outer sock. In other words, the inner sock is at contact with the reference form.

Preferably, after cross-linking the thermoplastic material, the inner sock is also joined to the inner sock in one or more areas of the upper, besides at the ankle area, so that it cannot be removed from said outer sock.

Preferably, after cross-linking the thermoplastic material, the inner sock is free to be removed from said outer sock, i.e. it is joined to the outer sock at the ankle area only.

Preferably, the auxiliary openings can be differently shaped depending on the weaving processing.

Preferably, heating the sock in the oven comprises: circulating a heating fluid in the oven.

Preferably, the heating fluid comprises: superheated air, steam, preferably superheated, or a mixture of superheated air and steam, preferably superheated.

Preferably, heating the sock in the oven comprises: radiating the sock with infrared rays.

Preferably, heating the sock in the often comprises: radiating the sock with infrared rays and circulating superheated air in the oven.

Preferably, the sock is brought to a temperature comprised between 50° C. and 280° C., preferably for a time comprised between 10 s and 200 s.

Preferably, the percentage of superheated air in the mixture of superheated air and steam, preferably superheated, is comprised between 10% and 70%.

Preferably, the temperature of the superheated air is comprised between 50° C. and 300° C.

Preferably, a temperature of the superheated steam is comprised between 150° C. and 200° C.

The Applicant observed that the qualitatively best results and least heating time in the oven can be achieved through the mixture of superheated air and steam preferably superheated. The steam at 100° C., or preferably the steam already superheated for example at 150° C. and 200° C., and the superheated air for example at 50° C.-300° C. lead to the formation of superheated steam. As a matter of fact, the aforementioned mixture allows to maximise the heat exchange with the sock, to uniform the temperature on sock in an optimised manner and avoid problems of condensation in the oven.

Preferably, the sock and the reference form are rotated in the oven during the heating. The rotation allows to uniform the temperature on the sock further.

Preferably, it is envisaged to carry out a first heating of the sock in a first oven, preferably by means of superheated air and steam, for pre-heating the sock, and carrying out a second heating of the sock in a second oven, preferably by means of superheated air and steam for determining the at least partial fusion of the thermoplastic material of the thermoplastic yarns of said sock.

Preferably, it is envisaged to cool the sock using cooled air, preferably using a rotation system to guarantee a uniform cooling on the surface.

Preferably, after heating, it is envisaged to remove the reference form with the sock from the oven.

Preferably, cooling the sock comprises: arranging the sock with the reference form in a cooling chamber, circulating cooled air in the cooling chamber.

Preferably, the sock is cooled up to a temperature.

Preferably, the cooled air has an ambient temperature.

Preferably, the cooled air has a temperature comprised between −10° and +10°.

Preferably, before fitting the sock on the reference form, it is envisaged to close the auxiliary opening or the auxiliary openings.

Preferably, closing the auxiliary opening comprises: cutting edges of the auxiliary opening and, preferably simultaneously, stitching and/or sealing said auxiliary opening.

Preferably, the cutting and sealing are carried out by means of ultrasounds. The ultrasounds generate localised heat which cuts and, exploiting the thermo-plasticity of the yarns, fuses and seals them.

Preferably, a shaping of the tip of the sock is also carried out during cutting and sealing.

The Applicant observed that the cutting and the sealing by means of ultrasounds allow to carry out an almost invisible closing of the tip, without projecting parts that could be uncomfortable for the person wearing the footwear.

Preferably, it is envisaged to arrange accessory elements on the reference form and/or on the sock.

Preferably, the accessory elements comprise: one or more reinforcements and/or one or more impermeable membranes and/or one or more decorative elements.

Preferably, the impermeable membrane/s is/are polyurethane.

Preferably, if the impermeable membrane is outside the sock, it bears decorative elements.

Preferably, the impermeable membrane is interposed between the inner sock and the outer sock.

Preferably, the impermeable membrane is applied after the upper has already been formed.

Preferably, said reinforcements comprise: a reinforcement for the tip and/or a reinforcement for the insole.

Preferably, said reinforcements are previously assembled/joined to each other to form a reinforcement structure subsequently applied to the reference form.

Preferably, before fitting the sock onto the reference form it is envisaged to arrange the accessory elements, preferably the reinforcements and/or the impermeable membrane on said reference form.

Preferably, after fitting the sock onto the reference form and before arranging the reference form with the sock in the oven, it is envisaged to arrange the accessory elements, preferably the decorative elements and/or further reinforcements on the sock.

Preferably, before arranging the reference form with the sock in the oven, it is envisaged to join the points of said accessory elements to the sock. The joining by points serves to temporarily stabilise the assembly before the heating in the oven which will determine the stable joining of all elements.

Preferably, the reinforcements and/or impermeable membrane are joined by points to the sock after fitting the sock onto the reference form and over the accessory elements.

Preferably, the decorative elements are joined by points to the sock once applied on the sock.

Preferably, the joining by points is carried out by means of a localised heating configured to determine the fusion of points of the thermoplastic material of the thermoplastic yarns of said sock and/or of the accessory elements.

Preferably, the inner sock and the outer sock have respective auxiliary openings obtained from a weaving step of said sock; wherein, before fitting the sock onto the reference form, it is envisaged to close the auxiliary opening of the outer sock; wherein, after arranging the accessory elements on the reference form, it is envisaged to fit only the outer sock onto the reference form by inserting the reference form through the auxiliary opening of the inner sock while the inner sock is arranged outside the outer sock.

Preferably, while only the outer sock is fitted onto the reference form, it is envisaged to join points of said accessory elements to the outer sock.

Thus, the auxiliary opening of the inner sock allows to fit—onto the reference form—the outer sock only and perform the temporary joining by points of only the outer sock to the accessory elements applied to the reference form. In such step, the inner sock remains hanging on the assembly formed by the reference form, by the accessory elements and by the outer sock.

Preferably, after joining the points of said accessory elements to the outer sock and before arranging the reference form with the sock in the oven, it is envisaged to: remove the reference form from the outer sock and the inner sock through the auxiliary opening of the inner sock, close the auxiliary opening of the inner sock, place the inner sock inside the outer sock, fit the inner sock and the outer sock on the reference form through the main opening.

Preferably, before arranging the reference form with the sock, of the single or double layer type, in the oven, it is envisaged to insert the reference form with the sock and, preferably, with the accessory elements into a heat-resistant bag (i.e. it resists to the temperatures to which it is subjected in the oven without breaking or being deformed).

Preferably, the bag is made of heat-resistant material.

Preferably, it is envisaged to place the heat-resistant bag under vacuum reducing the internal pressure thereof to below the atmospheric pressure.

The vacuum heat-resistant bag allows to compress all the elements on the reference form and hold them in position during heating in the oven.

Preferably, a vacuum in the bag is comprised between −10 and −80 kPa.

Preferably, a pressure on the sock is comprised between 100 and 800 g/cm$^2$.

Preferably, the reference form with the sock are removed from the heat-resistant bag after the cooling and cross-linking of the thermoplastic material. Thus, removal occurs after the assembly has stabilised.

Preferably, the bag is internally coated with a material/film which facilitates the detachment thereof from the sock after the cooling and the cross-linking of the thermoplastic material.

Preferably, the oven comprises an outer casing and an inner casing delimiting between them an interspace, wherein the inner casing delimits a containment volume and has passage holes communicating with the interspace. The inner casing is configured to receive the sock on the reference form.

The oven further comprises heating elements, for example heating electrical resistors, arranged in the interspace.

The oven further comprises a fan operatively active between the containment volume and the interspace to determine the circulation of a fluid between the containment volume and the interspace.

Preferably, the fan is configured to suction the fluid through a main mouth of said fan facing into the containment volume and for blowing it into the interspace and onto the resistors and from here into the containment volume once again by means of the passage holes.

Preferably, the oven further comprises a steam generation device, preferably superheated, connected to the nozzles operatively active in the containment volume and/or in the interspace for introducing vapour into said oven.

Preferably, the apparatus comprises a support for the reference form and devices for driving the reference form in rotation with the sock when it is arranged in the containment volume of the oven.

Preferably, the apparatus comprises a cutting and closing or sealing machine configured to close the auxiliary opening or the auxiliary openings.

Preferably, the cutting and closing machine is a sewing machine.

Preferably, the cutting and sealing machine is an ultrasonic cutting and sealing machine.

Preferably, the ultrasonic machine comprises:
- a lower wheel which rotates around a horizontal rotation axis;
- a sonotrode connected to the lower wheel to determine an ultrasonic vibration according to one or more transversal directions with respect to the rotation axis, preferably along a vertical direction;
- an upper wheel which rotates around a horizontal rotation axis Y and it has a tapered edge which touches the lower wheel and which—due to the vibration—locally generates heat for cutting and sealing.

Preferably, the apparatus comprises an electric stapler with an iron box configured for carrying out the temporary joining by points of the sock to the accessory elements.

Preferably, the apparatus comprises a vacuum device that can be engaged to the heat-resistant bag to reduce the internal pressure to below the atmospheric pressure.

Further characteristics and advantages will be more apparent from the detailed description of preferred but non-exclusive embodiments of a method and an apparatus for the three-dimensional forming of an upper of a footwear, according to the present invention.

DESCRIPTION OF THE DRAWINGS

Such description will be outlined hereinafter with reference to the attached drawings, provided solely for by way of non-limiting example, wherein.

DETAILED DESCRIPTION OF AN EMBODIMENT OF THE INVENTION

Figure 1:
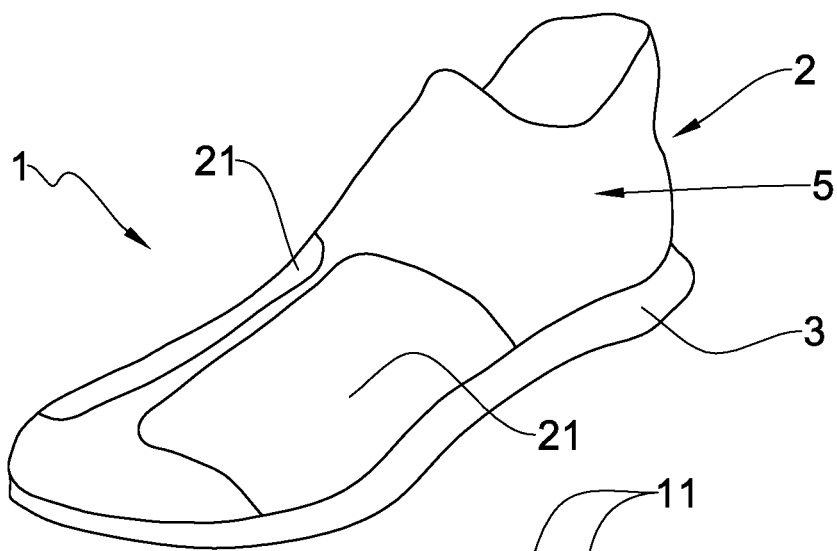
FIG. 1 illustrates a footwear obtained with the process, with the method and with the apparatus according to the present invention.

With reference to FIG. 1, a footwear obtained through the process, the method and the apparatus according to the present invention, was indicated in its entirety with 1.

The footwear 1 comprises an upper 2 and a sole 3. As specified above, the upper 2 wraps the foot and comprises both the upper part of the footwear 1—most exposed and visible—which covers the top part of the foot as well as the lower part, or insole, intended to remain concealed between the upper part and the sole 3 of the footwear 1.

The upper 2 is formed starting from a sock 4 and possibly from other elements as specified hereinafter.

The sock 4 is obtained by means of weaving, for example using a knitting loom of the circular type, of per se known type and thus not described herein.

The sock 4 comprises natural and/or synthetic yarns and it is also provided with thermoplastic yarns, i.e. yarns formed by thermoplastic polymers (heat-fusible and/or heat-shrinking) which have the capacity to modify the structure thereof at a determined temperature (usually comprised between 60° C. and 180° C.) and thus fuse upon reaching such temperature and cross-link once cooled.

The thermoplastic yarns are arranged in different manners and with different densities and percentages during weaving. For example, the percentage of the thermoplastic yarns is higher at the tip and/or at the heel and/or at the insole of the upper 2 and lesser elsewhere. For example, at the tip and at the heel the percentage of thermoplastic yarns is comprised between 20% and 80%. For example, at the insole the percentage of thermoplastic yarns is comprised between 50% and 60%.

The arrangement and/or characteristics of the thermoplastic yarns allow to obtain consistencies and/or rigidities differentiated in terms of different areas/portions/points of the upper 2 obtained through the method of the invention.

Figure 3:
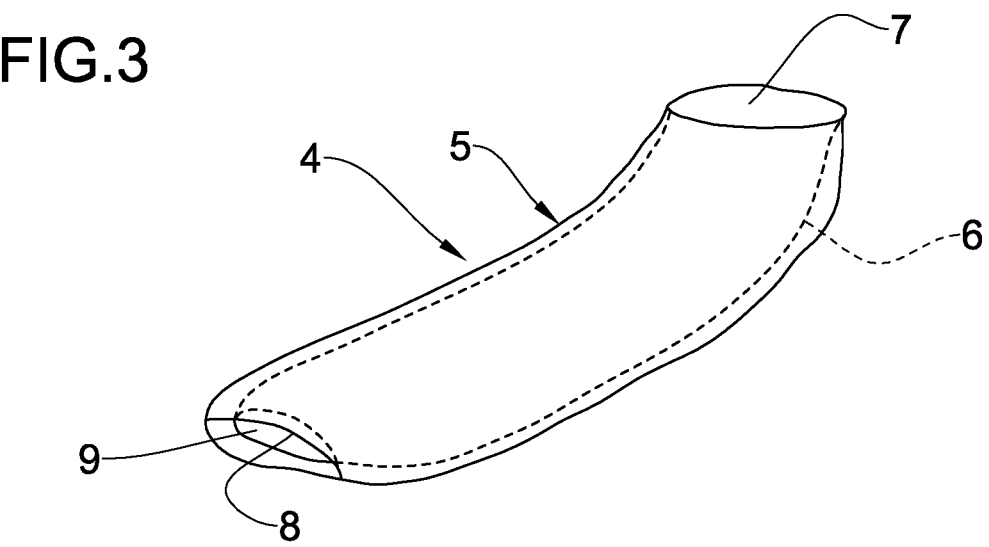
FIG. 3 shows an embodiment of the sock comprising thermoplastic yarns used in the method according to the present invention.
Figure 4:
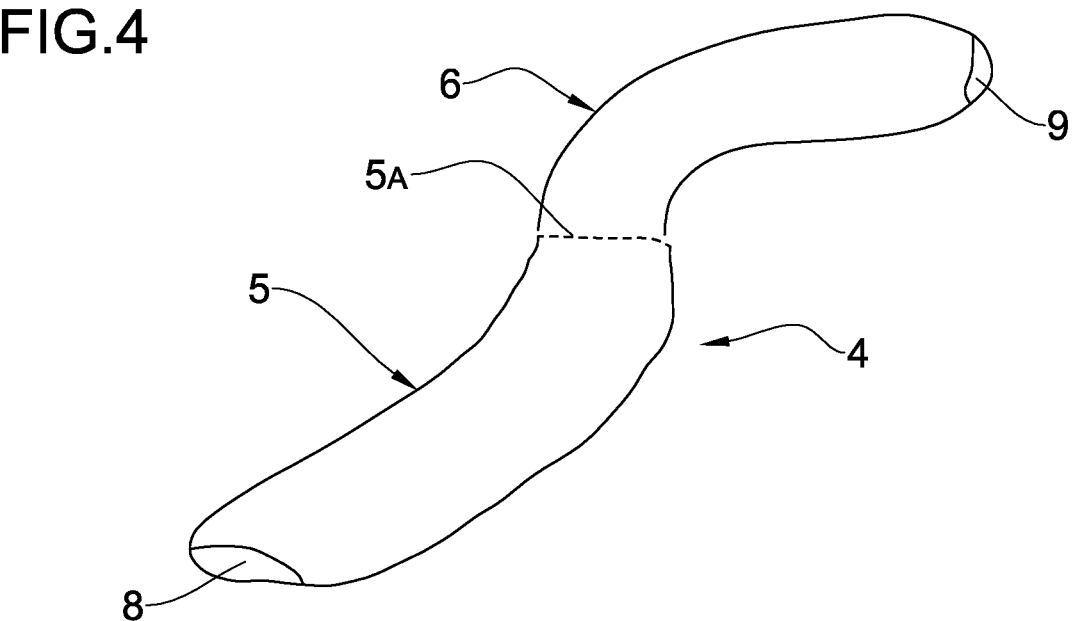
FIG. 4 illustrates the sock of FIG. 3 in a different configuration.

According to a first embodiment, illustrated in FIGS. 3 and 4, the sock 4 is formed by two layers and comprises a first sock 5, or outer sock, and a second sock 6, or inner sock, mutually joined at, for example, an area designated to be positioned around an ankle 5A of a user. The inner sock 6 and the outer sock 5 are woven in a single weaving step. At the end of the weaving, the inner sock 5 and the outer sock 6 are mutually joined in said ankle area 5A and consecutively arranged one with respect to the other to form a single tubular body provided with two auxiliary openings 8, 9 arranged at the opposite ends thereof, as illustrated in FIG. 4. The inner sock 6 can be turned inside-out and positioned inside the outer sock 5 to form a double-layer sock 4, as illustrated in FIG. 3.

When the inner sock 6 is turned inside-out and inserted into the outer sock 5, the sock 4—as a whole—has a main opening 7 configured to allow to insert a foot and for defining, for example, the portion of the upper 2 arranged around the ankle of the person who is wearing it. The outer sock 5 has its own auxiliary opening 8 arranged on an end/tip thereof and even the inner sock 6 has an auxiliary opening 9 thereof arranged on an end/tip thereof. The auxiliary openings 8, 9 are obtained from the weaving processing of said sock 4, in the sense that the loom for the knitting machine of the circular type used to make it does not envisage closing them. One or both of the auxiliary openings 8, 9 have unfinished and frayed edges. As will be clearer hereinafter, the auxiliary opening 9 of the inner sock 6 is preferably utilised in the method according to the invention.

According to a simpler second embodiment, the sock 4 is formed by a single layer which corresponds to the outer sock of FIGS. 3 and 4 only (i.e. it is not provided with the inner sock 6). In such embodiment, the sock 4 has the main opening 7, which is shaped and configured to allow to insert the foot and to define, for example, the portion of the upper 2 arranged around the ankle, and an auxiliary opening 8 arranged at the tip of the sock 4. The auxiliary opening 8 is obtained from the weaving processing of said sock 4, in the sense that the loom for the knitting machine of the circular type used to make it does not envisage closing it. Thus, the auxiliary opening 8 has unfinished and frayed edges. The main opening 7 is instead preferably finished.

Described hereinafter is the method in its entirety which uses the sock 4 of the first embodiment alongside other accessory elements.

Figure 2:
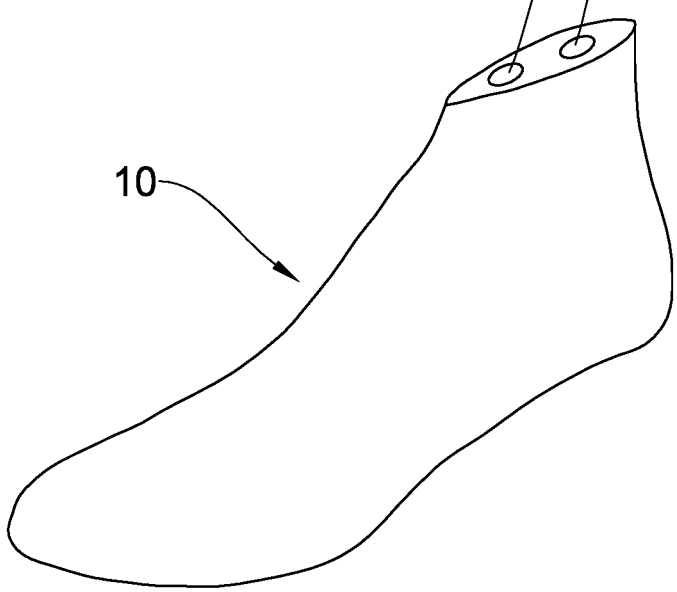
FIG. 2 illustrates a reference form of an upper to be formed, used in the method according to the present invention.

According to the method of the invention, a reference form 10 which reproduces the upper 2 to be formed in negative (FIG. 2) is prepared. The reference form 10 is made of plastic material and it is such to be able to withstand high temperatures and pressure without deteriorating and/or deforming. The reference form 10 substantially reproduces the shape of a foot and it is provided, at the ankle, with anchoring elements 11 (schematised as holes) for the engagement with a support 12, illustrated in FIG. 11.

Figure 5:
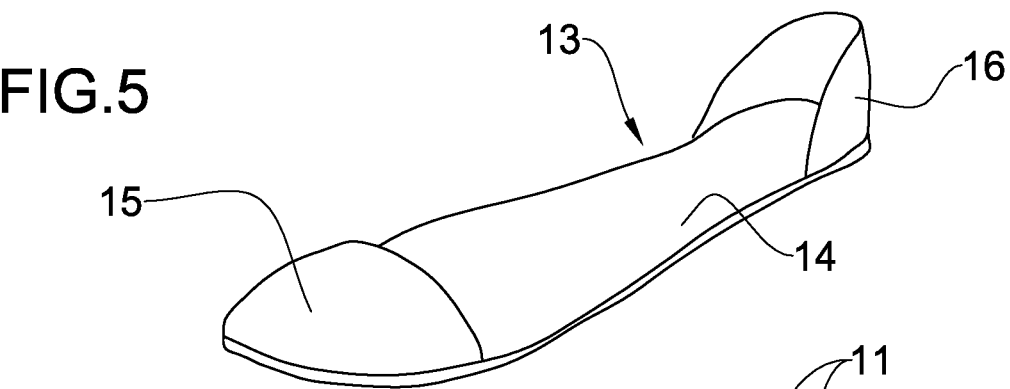
FIG. 5 illustrates reinforcement elements to be applied to the sock according to the method of the present invention.
Figure 6:
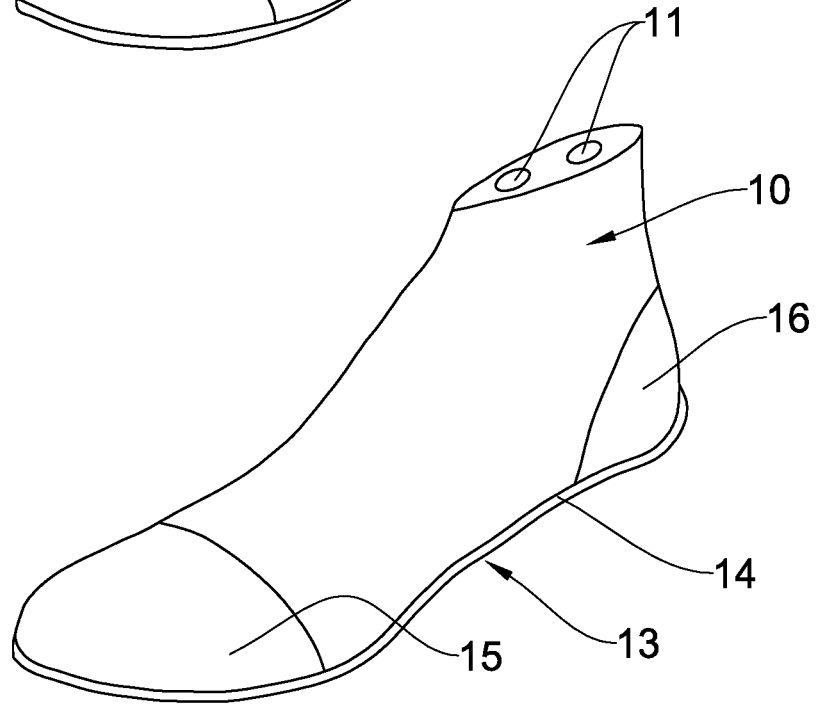
FIG. 6 illustrates the reference form on which the reinforcement elements are applied according to a step of the method of the present invention.

Besides the sock 4, a reinforcement structure 13 which, in the non-limiting embodiment illustrated in FIG. 5, comprises a reinforcement for the insole 14, a reinforcement for the tip 15 and a reinforcement for the heel 16 is made in advance. The reinforcement structure 13 is also preferably made of plastic material or it comprises plastic material or it has one side with a heat-adhesive agent.

Furthermore, an impermeable membrane, not illustrated in the attached figures, with a shape similar to that of the outer sock 5, can be prepared and used. The impermeable membrane is for example polyurethane.

Figure 8:
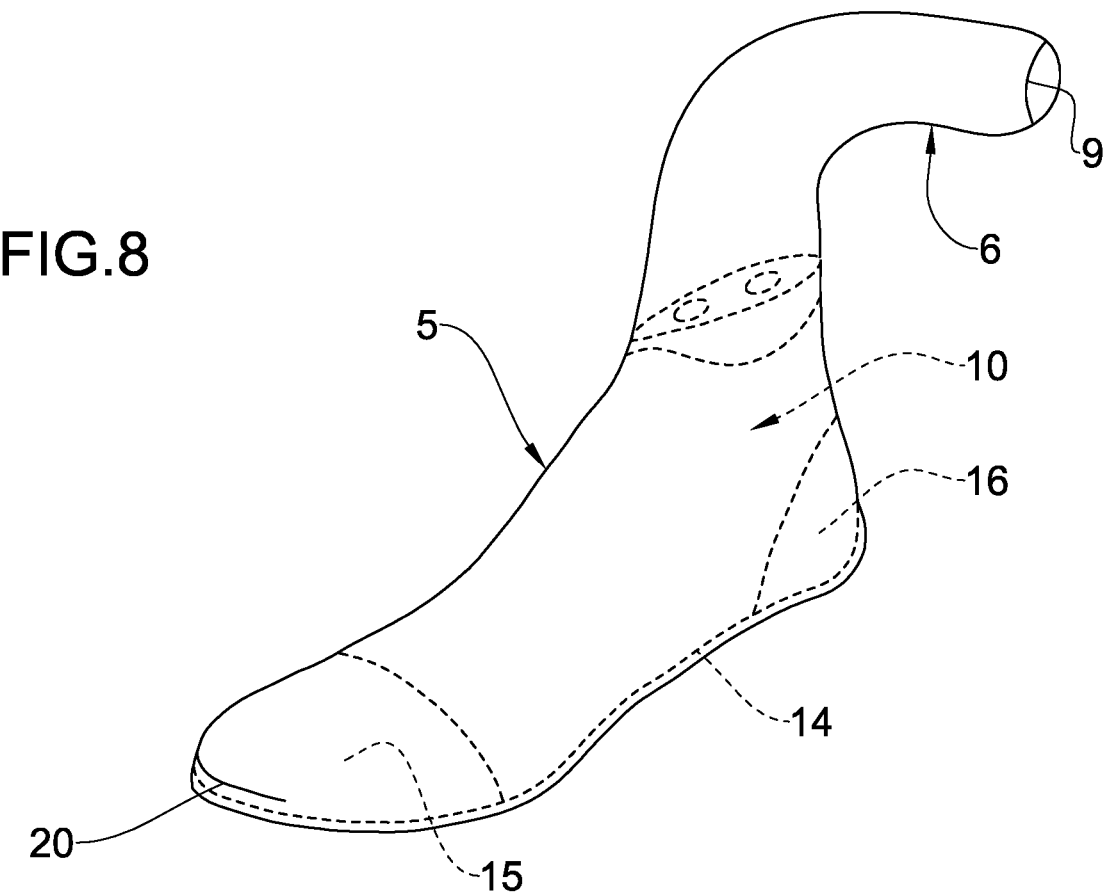
FIGS. 8, 9 and 10 illustrated the reference form with the sock of the second embodiment in respective steps of the method of the present invention.

The method provides for fitting the reinforcement structure 13 on the reference form 10 first, like in FIG. 5, and then the impermeable membrane and then fitting the outer sock 5 only on the reference form 10 and above the impermeable membrane and the reinforcement structure 13 (FIG. 8).

To this end, before fitting the outer sock 5, the auxiliary opening 8 of the outer sock 5 is closed by cutting the edges thereof and sealing it by means of the ultrasonic cutting and sealing carried out simultaneously by means of an ultrasonic cutting and sealing machine (FIG. 7), per se known and thus just described summarily.

Figure 7:
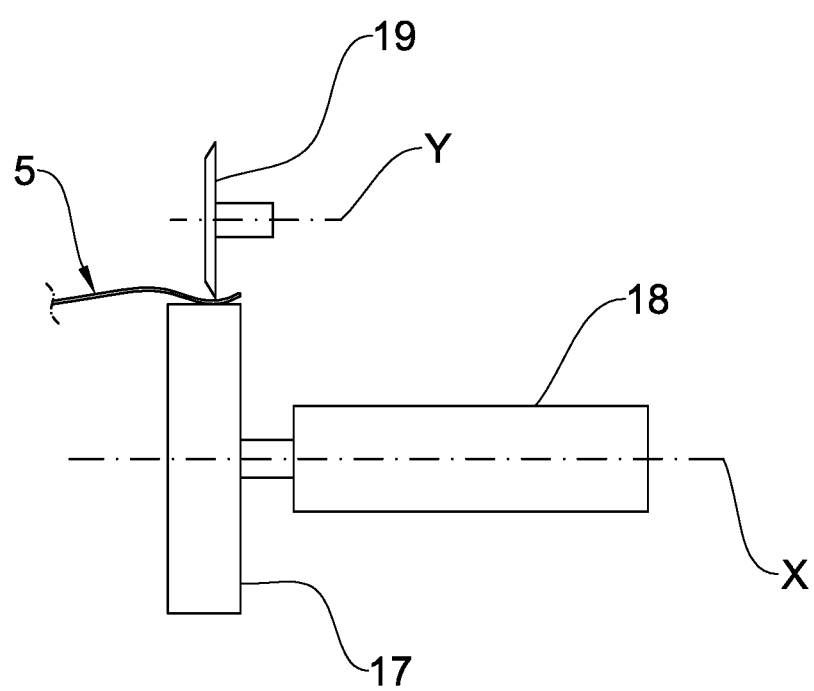
FIG. 7 illustrates a sock during a step of the method according to the present invention.
Figure 9:
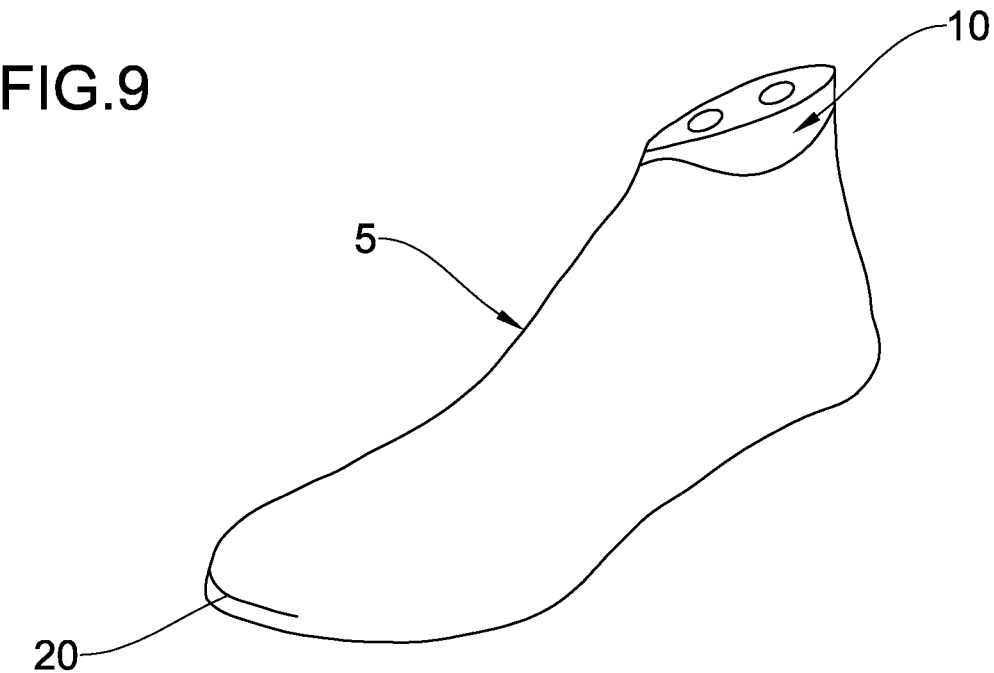
Figure 10:
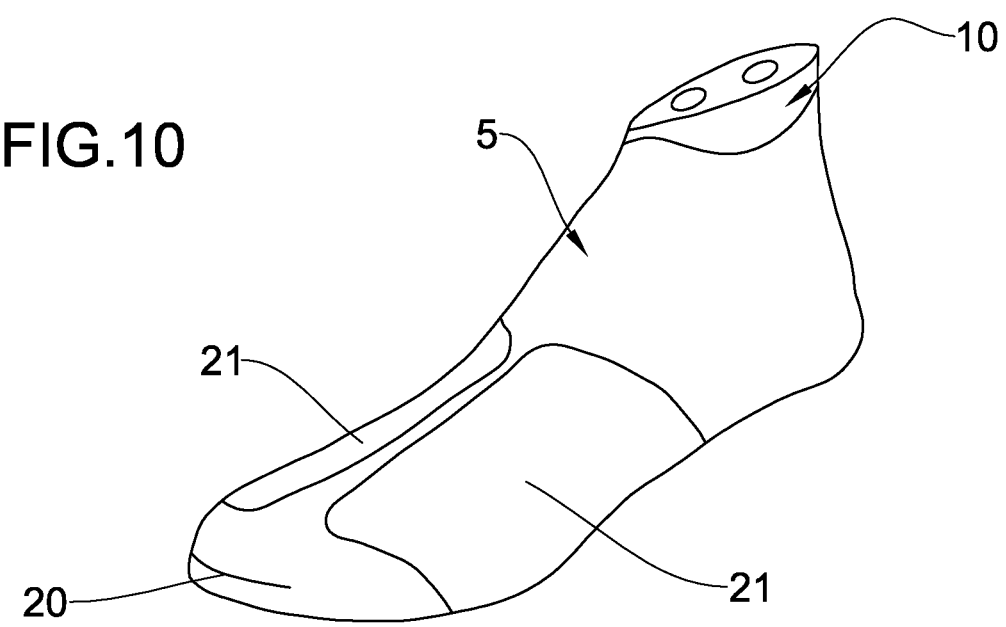

The ultrasonic machine, schematically illustrated in FIG. 7, comprises: a lower wheel 17 which rotates around a horizontal rotation axis X; a sonotrode 18 connected to the lower wheel 17 to determine an ultrasonic vibration according to a vertical direction; an upper wheel 19 which rotates around a horizontal rotation axis Y and it has a tapered edge which touches the lower wheel 17 and which generates heat locally due to the vibration. The localised heat cuts and, exploiting the thermo-plasticity of the yarns, fuses and seals them. During cutting and sealing, the ultrasonic machine also allows to carry out the shaping of the tip of the sock. By way of example, FIGS. 8, 9 and 10 illustrate a sealing line 20. Actually, the cutting and sealing through ultrasonic means allow to close the tip almost invisible, without parts in relief which could be uncomfortable for the person wearing the footwear 1.

Alternatively, the auxiliary opening 8 of the outer sock 5 can be cut and closed by means of a cutting and sewing, with a less prestigious aesthetic technical effect. At this point, the reference form 10 is inserted into the sock 4 through the auxiliary opening 9 of the inner sock 6 up to fitting the outer sock 5 only on the reference form 10 and leaving the inner sock 6 outside the outer sock 5 and hanging onto said outer sock 5 (FIG. 8).

While only the outer sock 5 is arranged on the reference form 10 and around the impermeable membrane and the reinforcement structure 13, the method envisages joining some points of the outer sock 5 to corresponding points of the reinforcement structure 13 and of the impermeable membrane by means of a localised heating, carried out by an electric stapler with a suitably shaped iron box, configured for determining the fusion of areas of the thermoplastic material of the thermoplastic yarns of the outer sock 5 and of the thermoplastic material of the reinforcement structure 13 and of the impermeable membrane. The joining by points serves to temporarily stabilise the assembly before a subsequent heating in an oven that will determine the stable joining of all elements.

Once through with joining by points, the reference form 10 is removed through the auxiliary opening 9 of the sock 4. Such auxiliary opening 9 of the inner sock 6 is also closed, for example, by cutting and sealing, as specified above. The inner sock 6 is inserted, turning it inside-out, into the outer sock 5 and fitted onto the reference form 10 which is inserted through the main opening 7 this time round. Thus, the reinforcement structure 13 and the impermeable membrane remain interposed between the inner sock 6 and the outer sock 5 and the inner sock is at direct contact with the reference form 10 (like in FIG. 9).

At this point, applied onto the outer sock 5 are decorative elements 21 (FIG. 10), for example in form of sheets and/or coloured patches with one side provided with a heat-adhesive agent, and temporarily joined to the outer sock 5 also through resistance welding. Any further reinforcement elements, not illustrated, can also be applied to the external of the outer sock 5.

The overall assembly formed by the reference form 10, by the inner sock 6, by the outer sock 5, by the reinforcement structure 13, by the impermeable membrane and by the decorative elements 21 is inserted into a heat-resistant plastic bag 22 which is connected to a vacuum device, not illustrated. The vacuum device removes the air contained in the heat-resistant bag 22 so as to reduce the internal pressure to below the atmospheric pressure and compress and hold in position all the elements on the reference form 10. For example, the vacuum in the bag 22 is of about −85 kPa so as to exert a pressure in the sock 4 of about 850 g/cm$^2$.

The assembly (reference form 10, inner sock 6, outer sock 5, reinforcement structure 13, impermeable membrane, decorative elements 21) with the bag 22 under vacuum is inserted into an oven 23.

Figure 11:
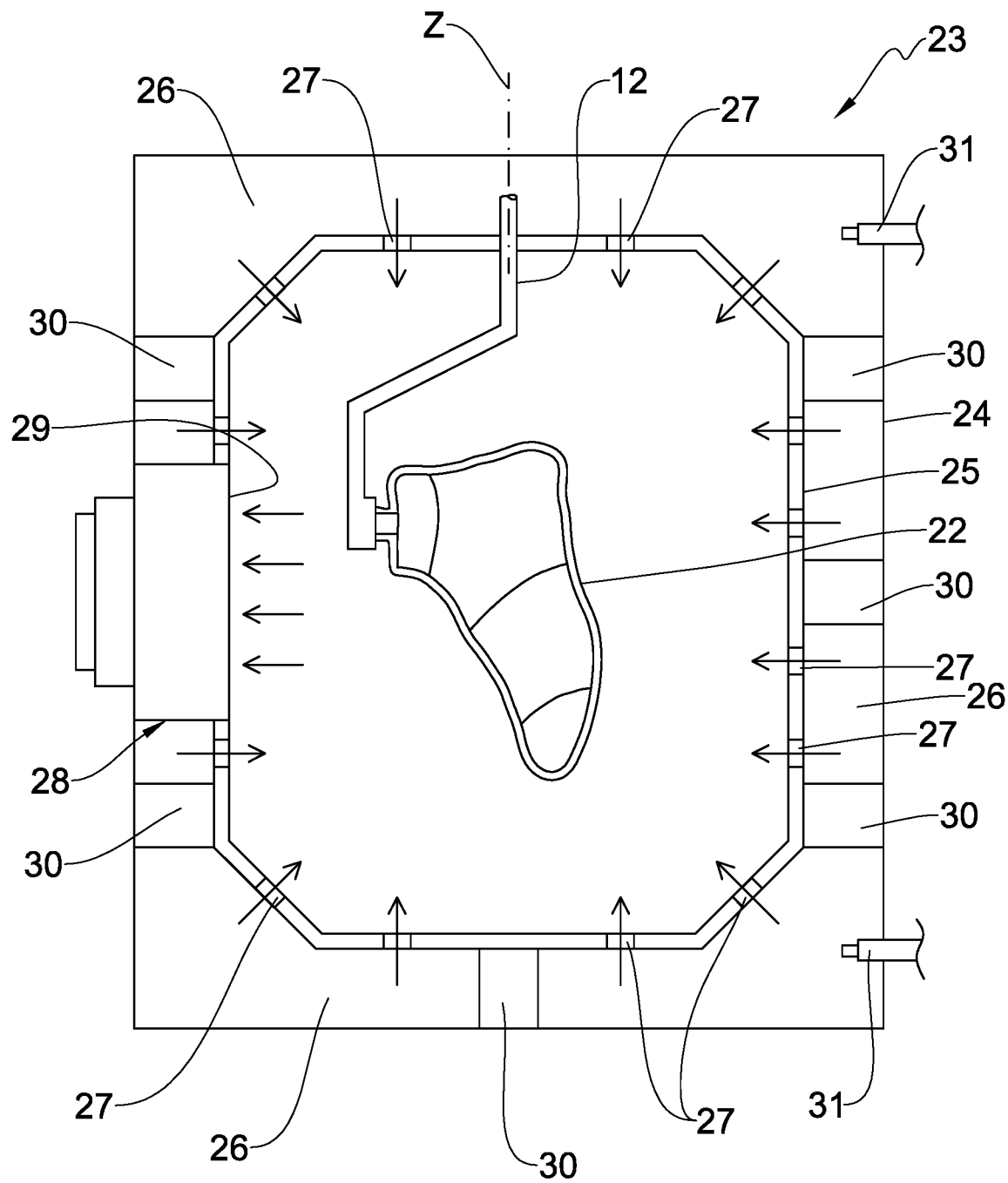
FIG. 11 illustrates the reference form with the sock arranged in an oven according to a further step of the method of the present invention.

The oven, illustrated in FIG. 11, comprises an outer casing 24 and an inner casing 25. The inner casing 25 delimits a containment volume designated to receive the assembly with the bag 22 under vacuum. The inner casing 25 and the outer casing 24 delimit an interspace 26 between them. The inner casing 25 is also provided with passage holes 27 which place the interspace 26 in communication with the containment volume.

A fan 28 is mounted on the outer casing 24 and on the inner casing 25 and it has a main mouth 29 facing in the containment volume and radially peripheral outlets which open into the interspace 26. The fan 28 is thus operatively active between the containment volume and the interspace 26 to determine the circulation of fluid between said containment volume and said interspace 26. The fan 28 suctions the fluid through the main mouth 29 and blows it into the interspace 26 and from here into the containment volume once again through the passage holes 27.

Heating electrical resistors 30, schematically illustrated in FIG. 11, are arranged in the interspace 26 and suitably power-supplied and controlled to heat the fluid circulating in the oven 23. The oven 23 is also provided with nozzles 31 facing into the interspace 26 and connected to a steam generation device, preferably superheated, not illustrated, configured to introduce steam into the oven 23.

The assembly with the bag 22 is positioned in the oven 23 by means of the support 12 which holds it hanging in the containment volume, i.e. spaced from internal walls of the oven 23. The support 12 is connected to devices, not illustrated, configured for rotating the support 12 and the assembly with the bag 22 around an axis Z.

The oven 23 is configured to circulate—therein—a fluid consisting of superheated air and steam, preferably superheated, which touches the bag 22 and uniformly heats the assembly (reference form 10, inner sock 6, outer sock 5, reinforcement structure 13, impermeable membrane, decorative elements 21) while the latter rotates on itself around the axis Z. The heating causes the at least partial fusion of the thermoplastic material of the thermoplastic yarns of the outer sock 5, possibly of those of the inner sock 6, of the reinforcement structure 13, of the impermeable membrane and of the decorative elements 21.

For example, the percentage of superheated air in the superheated air and steam mixture is between 10% and 70%; the temperature of the superheated air is between 50° and 300° C.; the temperature of the superheated steam is between 150° C. and 200° C.; the pressure inside the oven is 0.1 bars. In this manner, the assembly (reference form 10, inner sock 6, outer sock 5, reinforcement structure 13, impermeable membrane, decorative elements 21) is brought to a temperature between 50° and 300° C. for a period of time between 10 and 300 sec.

In variant embodiments, not described in detail, instead of the mixture of superheated air and steam, the following can be used for heating: superheated air only, steam only, preferably superheated, radiation with infrared rays only, combination of infrared rays and superheated air.

In variant embodiments, not described in detail, it is envisaged to carry out a first heating of the sock 4 in a first oven, preferably by means of superheated air and steam, for pre-heating the sock 4, and carry out a second heating of the sock 4 in a second oven, preferably by means of superheated air and steam for determining the at least partial fusion of the thermoplastic material of the thermoplastic yarns of said sock 4.

Figure 12:
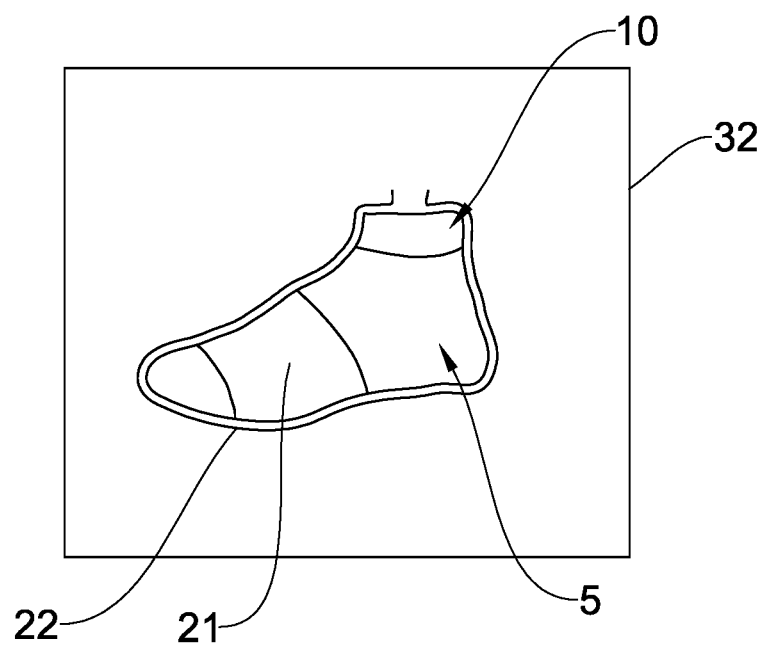
FIG. 12 illustrates the reference form with the sock arranged in a cooling chamber according to a further step of the method of the present invention.

Subsequently, the assembly still wrapped in the vacuum bag 22 is removed from the oven 23 and inserted into a cooling chamber 32 (schematically illustrated in FIG. 12) circulated in which is cooled air, for example at a temperature between −10° and +10°, so as to cool the assembly up to the ambient temperature.

The cooling determines the cross-linking and the hardening of the thermoplastic material, the formation of the upper 2 with more rigid portions and less rigid portions, the mutual and stable joining of the outer sock 5 with the reinforcement structure 13, with the impermeable membrane and with the decorative elements 21. As a function of the distribution of the thermoplastic yarns in the outer sock 5 and/or in the inner sock 6, after cross-linking the thermoplastic material, the inner sock 6 can be joined to the outer sock 5, as well as at the ankle area, even in one or more areas of the upper 2, so that it cannot be removed from said outer sock 5, or it is free to be removed from said outer sock 5, i.e. it is joined to the outer sock 5 only at the ankle area 5A.

The reference form 10 with the assembly are removed from the heat-resistant bag 22 after the cooling and cross-linking of the thermoplastic material, i.e. when the assembly is stabilised. The heat-resistant bag 22 is preferably internally coated with a film that facilitates the detachment thereof from the sock after the cooling and cross-linking of the thermoplastic material.

At this point, the upper 2 can be removed from the reference form 10 to subject it to further processing.

For example, according to the manufacturing process of a footwear according to the present invention, it is envisaged to apply the sole 3 to the upper 2 so as to obtain the footwear 1 of FIG. 1.

Simpler embodiments of the method are equally part of the present invention.

According to a first variant of the method which does not envisage the reinforcement structure, the decorative elements and the impermeable membrane but comprise the sock 4 only (of the single or double layer part), it is envisaged to close the auxiliary opening or the auxiliary openings 8, 9, fit the sock 4 on the reference form 10 and introduce such assembly into the oven 23 without any heat-resistant bag (given that it is not required) and then cooling it in the cooling chamber 32.

A second variant of the method envisages the reinforcement structure 13, the decorative elements 21 and the impermeable membrane but it comprises the outer sock 5 only (single-layer sock 4). In this variant, it is envisaged to close the auxiliary opening 8, fit the reinforcement structure 13 and then the impermeable membrane onto the reference form 10, fit the sock 4 onto the reference form 10 and above the impermeable membrane and the reinforcement structure 13, apply the decorative elements 21 onto the outer sock 5, temporarily join the reinforcement structure 13 and the decorative elements 21 to the sock 4 through electric resistance welding, introduce the assembly into the heat-resistant bag 22. The assembly with the heat-resistant bag 22 are then introduced into the oven 23 and then into the cooling chamber 32.

In other variants, not illustrated, the impermeable membrane is applied outside the sock 4, preferably when the upper has already been formed, and in this case said membrane can also carry the decorative elements.

The oven 23, the cooling chamber 32, the ultrasonic cutting and sealing machine, the electric stapler, the vacuum device are part of an apparatus for the three-dimensional forming of an upper of a footwear, also according to the present invention.

The invention claimed is:

1. A method for three-dimensional forming of an upper of a footwear, comprising:
    preparing a sock comprising thermoplastic yarns, the sock further comprising an inner sock and an outer sock mutually joined at an ankle area, wherein the inner sock is configured to be placed inside the outer sock to form a double layer and the inner sock and the outer sock have respective auxiliary openings obtained from a weaving step of the sock;
    closing the auxiliary opening of the outer sock;
    arranging accessory elements on a reference form of an upper to be formed;
    fitting only the outer sock onto the reference form by inserting the reference form through the auxiliary opening of the inner sock while the inner sock is arranged outside the outer sock;
    placing the reference form with the sock in at least one oven;
    heating the sock in the oven up until a determination of at least partial fusion of thermoplastic material of the thermoplastic yarns of said sock;
    cooling the sock up until a determination of a cross-linking of the thermoplastic material and a formation of the upper with more rigid portions and less rigid portions; and
    removing the upper from the reference form;
    wherein heating the sock in the oven comprises circulating a superheated steam in the oven.

2. The method according to claim 1, wherein circulating the superheated steam comprises forming a mixture of air and steam.

3. The method according to claim 1, wherein cooling the sock comprises removing the reference form with the sock from the oven and placing it in a cooling chamber, and circulating cooled air in the cooling chamber.

4. The method according to claim 1, wherein the sock has a main opening configured to insert a foot and at least one auxiliary opening obtained from a weaving step of said sock;

wherein the method further comprises closing the auxiliary opening and then fitting the sock on the reference form; wherein closing the auxiliary opening comprises cutting edges of the auxiliary opening and at the same time sealing said auxiliary opening by means of ultrasounds.

5. The method according to claim 1, wherein, after the cross-linking of the thermoplastic material, the method further comprises joining the inner sock to the outer sock in one or more areas of the upper.

6. The method according to claim 1, comprising arranging accessory elements on the reference form, fitting the sock onto the reference form, joining points of said accessory elements to the sock and then arranging the reference form with the sock in the oven; wherein joining points of said accessory elements to the sock comprises determining fusion of points of the thermoplastic material of the thermoplastic yarns of said sock and/or of the accessory elements through a localized heating.

7. The method according to claim 1, comprising fitting the sock on the reference form, and arranging accessory elements on the sock, joining points of said accessory elements to the sock and then placing the reference form with the sock in the oven; wherein joining points of said accessory elements to the sock comprises determining fusion of points of the thermoplastic material of the thermoplastic yarns of said sock and/or of the accessory elements through localized heating.

8. The method according to claim 1, comprising joining points of said accessory elements to the outer sock while only the outer sock is fitted on the reference form; wherein joining points of said accessory elements to the outer sock comprises determining fusion of points of the thermoplastic material of the thermoplastic yarns of said outer sock and/or of the accessory elements through localized heating.

9. The method according to claim 8, comprising removing the reference form from the outer sock and the inner sock through the auxiliary opening of the inner sock, closing the auxiliary opening of the inner sock, placing the inner sock inside the outer sock, fitting the inner sock and the outer sock on the reference form through the main opening, arranging the reference form with the sock in the oven.

10. The method according to claim 1, comprising inserting the reference form with the sock in a heat-resistant bag and placing the heat-resistant bag under vacuum, reducing an internal pressure of the heat-resistant bag to a pressure below an atmospheric pressure; wherein the reference form with the sock is removed from the heat-resistant bag after cooling and cross-linking the thermoplastic material.

11. The method according to claim 1, wherein a temperature of the superheated steam is between 150° C. and 200° C.

12. The method according to claim 2, wherein, in the mixture, a temperature of the air is between 50° C. and 300° C. and a temperature of the steam is 100° C.

13. The method according to claim 2, wherein the steam for the mixture is already superheated at a temperature between 150° C. and 200° C.

14. The method according to claim 2, wherein a percentage of air in the mixture is between 10% and 70%.

* * * * *